United States Patent Office 3,161,901
Patented Dec. 22, 1964

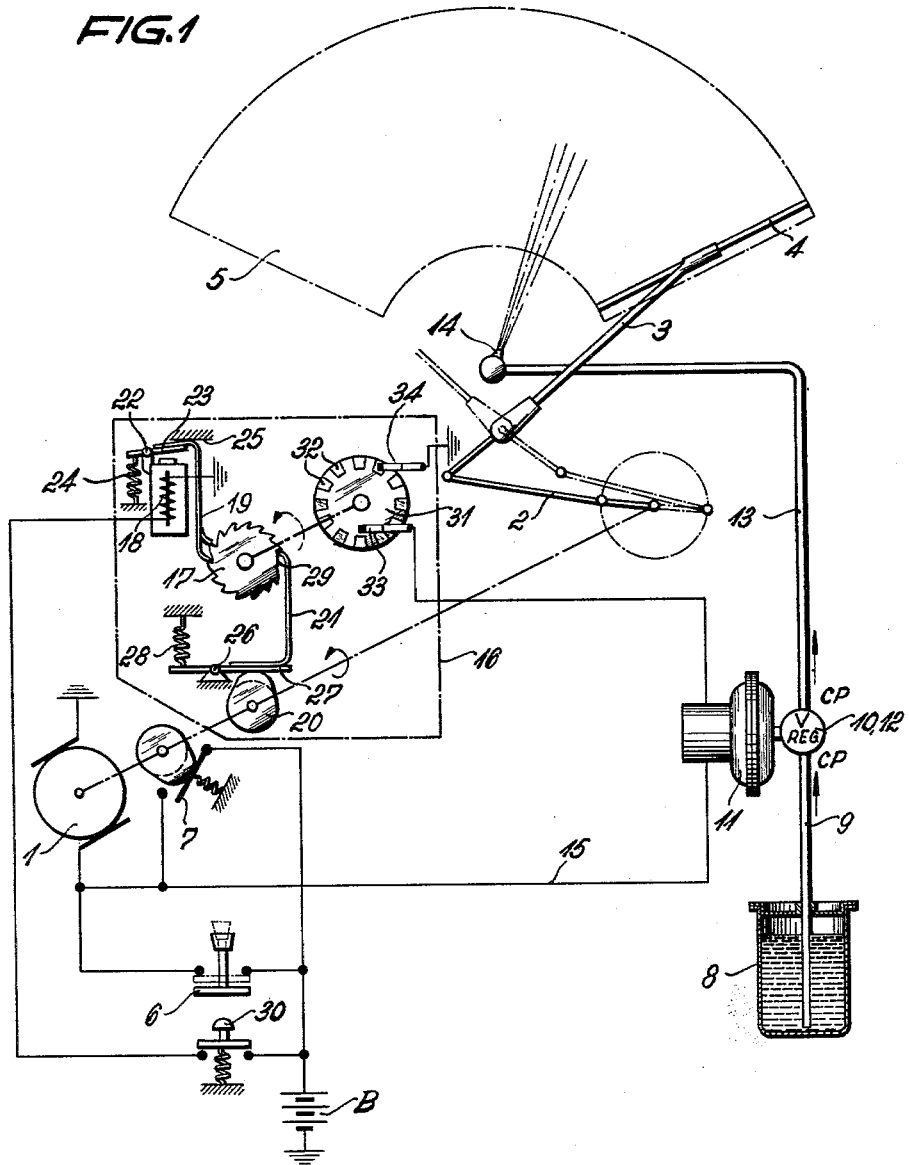

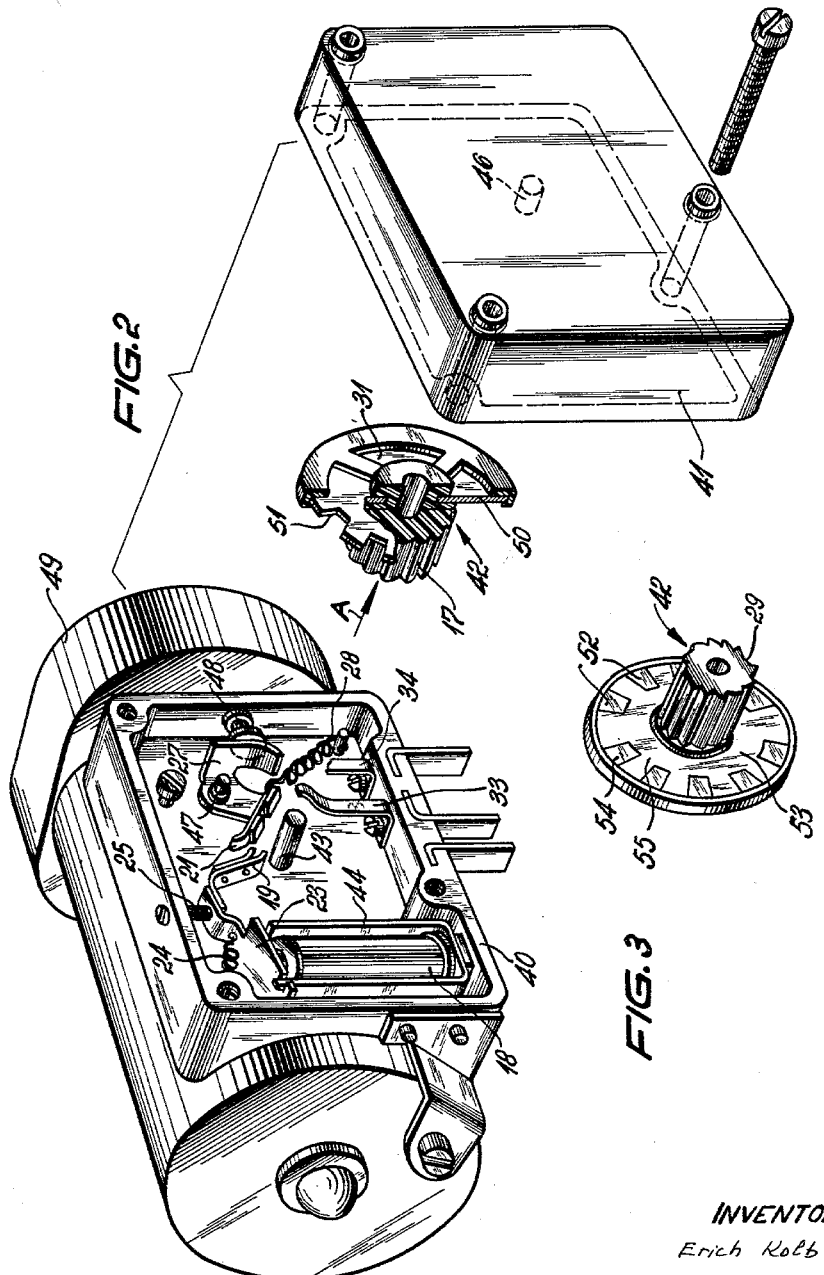

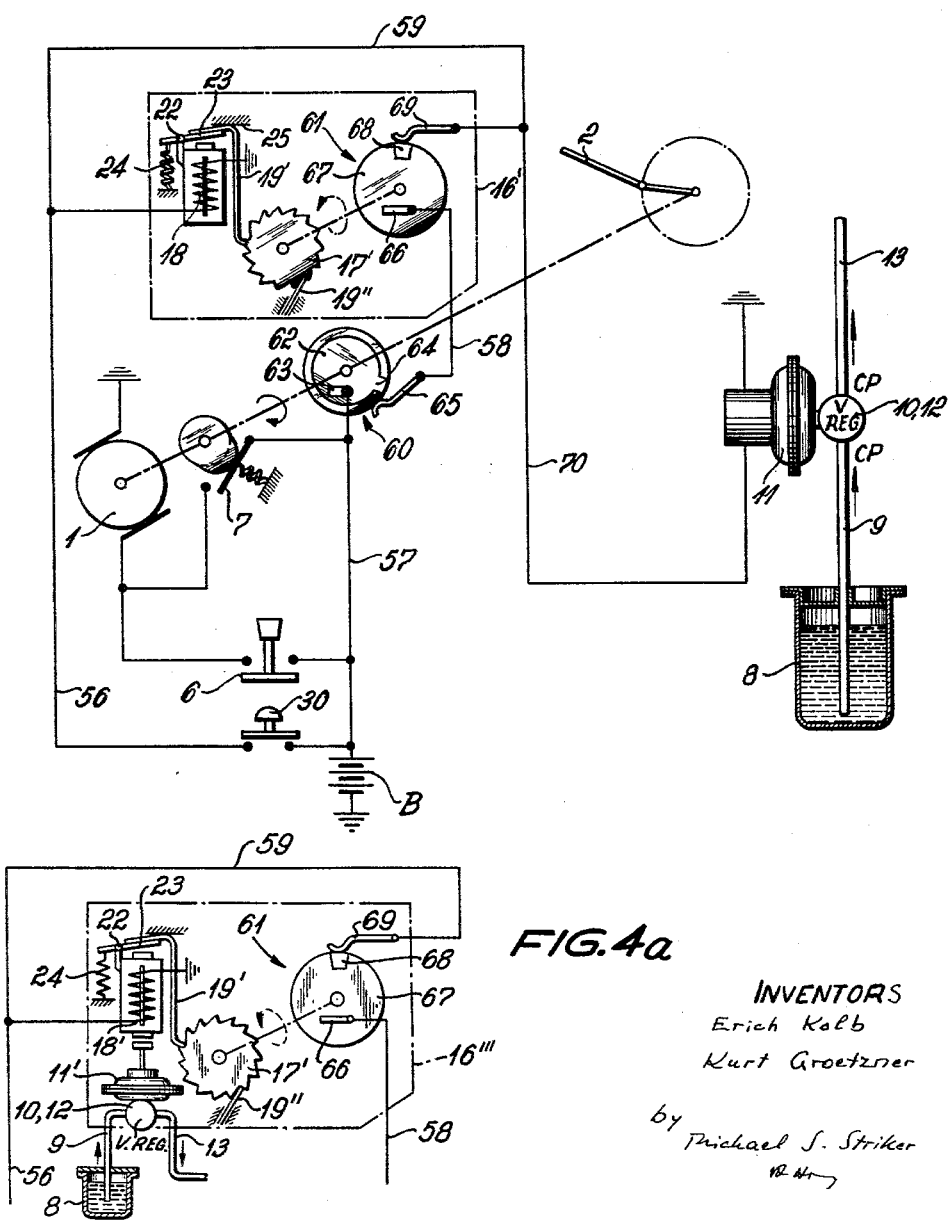

3,161,901
WIPER ASSEMBLY FOR WINDSHIELDS
OR THE LIKE
Erich Kolb, Eisental, near Buhl, and Kurt Groetzner, Stuttgart-Zuffenhausen, Germany, assignors to Robert Bosch G.m.b.H., Stuttgart, Germany
Filed Sept. 18, 1963, Ser. No. 309,619
Claims priority, application Germany, Sept. 22, 1962,
B 68,947
10 Claims. (Cl. 15—250.02)

The present invention relates to wiper assemblies of the type used to operate on windshields or the like.

Such assemblies are conventionally used to perform two functions. Thus, such assemblies are used to keep a windshield clear during rain, snow, or the like, as is well known. In addition, such assemblies are used for cleaning purposes. Thus, when a windshield is dirty it is possible for the operator of a conventional assembly to cause a cleaning liquid to be applied to the windshield and the wiper assembly is operated at this time to spread the cleaning liquid over the windshield and to cooperate with the cleaning liquid for cleaning the windshield.

At the present time assemblies of this latter type are not completely satisfactory. Thus, in order to start the operation of such an assembly, when it is desired to clean a windshield or the like, it is necessary for the operator to manipulate an element such as a switch-closing button, and the conventional assemblies at the present time require the operator to maintain such a switch-closing element, for example, in its closed position for a predetermined length of time in order for the cleaning operations to proceed properly. Should the operator release the starting button or the like prematurely, there will be no operation of the structure to clean the windshield or there may be a faulty operation. This drawback is of course inconvenient when a vehicle is stationary, and it is particularly undesirable when a vehicle is moving since under these conditions the attention of the operator is diverted from traffic conditions in order to make sure that the cleaning operations proceed properly.

It is therefore a primary object of the present invention to avoid the above drawback by providing an assembly of the above type which does not require the operator to maintain a starting element in a certain position for a certain length of time. Thus, the objects of the invention include the provision of an apparatus which requires the operator only to actuate an element for an instant, and then the operations will proceed reliably and properly in their normal way, so that hardly any attention of the operator need be diverted from the driving of the vehicle.

A further object of the present invention is to provide a structure of this type which when once started will automatically continue to operate to provide an effective cleaning and will then automatically terminate its own operation.

Still another object of the present invention is to provide a structure of the above type which is relatively simple and compact so that it does not require much space and can be conveniently situated in any vehicle.

Still another object of the present invention is to provide a structure of the above type which makes it possible to set the cleaning apparatus into operation when the wiper is operating.

It is also an object of the present invention to provide a structure of the above type which in response to manual actuation of a single element starts and after a predetermined time stops the wiper and also operates during this time the structure for applying cleaning liquid to the windshield.

Yet another object of the present invention is to provide an assembly whose components are electrically connected to each other so that the separate components may be situated at any desired location since they need be interconnected only by wires.

With the above objects in view the invention includes, in a wiper assembly for windshields or the like, a motor means for driving a wiper over a given area of a windshield and a feeding means for feeding a cleaning liquid to this area. An operating means is operatively connected to the feeding means to operate the latter to feed a given amount of cleaning liquid during a given number of operating cycles of the wiper whereupon the operating means terminates automatically the operation of the feeding means, and after an initial increment of operation, the operating means is self-operating, which is to say it maintains itself operating until it automatically terminates the operation of the feeding means. A manually operable means is operatively connected to the operating means to actuate the latter to effect the initial increment of operation, whereupon the running of the operating means continues automatically in the manner described above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of one possible embodiment of a structure according to the present invention;

FIG. 2 is a fragmentary, partly sectional, exploded, perspective illustration of components of the structure of FIG. 1;

FIG. 3 is a perspective view of a unit of FIG. 2 as seen in the direction of the arrow A of FIG. 2;

FIG. 4 is a schematic illustration of another embodiment of a structure according to the present invention;

FIG. 4a is a partial schematic illustration of an embodiment similar to that shown in FIG. 4, but showing a slight modification.

Figure 5:
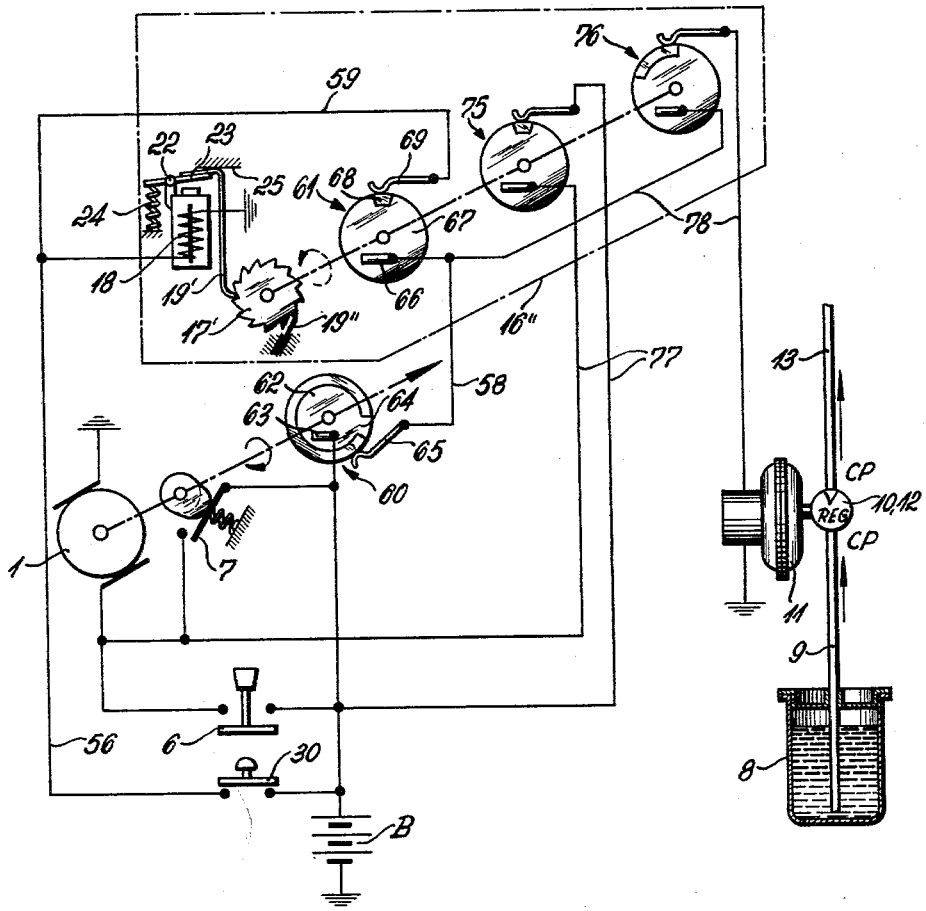
FIG. 5 is a schematic illustration of a fourth embodiment of a structure according to the present invention.

The aassembly of FIG. 1 includes an electric motor 1 which through an unillustrated drive as well as a crank rod 2 oscillates the pivotally mounted arm 3 which carries a wiper 4, so that in this way the motor 1 forms a motor means for driving the wiper 4 back and forth over the area 5 indicated in FIG. 1, this being an area of a windshield or the like. The motor means 1 is located in an electrical circuit as diagrammatically indicated in FIG. 1, and there is available to the operator a pull-switch 6 which when pulled by the operator from the solid to the dot-dash line position shown in FIG. 1 energizes the motor means 1 so that the latter operates to drive the wiper 4. Thus, at any time the operator may close or open the switch 6 so as to start or stop, respectively, the motor means 1 and thus the wiper 4. The motor means 1 also drives a cam which controls a switch 7 which is connected in parallel with the switch 6, this switch 7 being actuated by the cam to maintain the motor 1 energized, even after the switch 6 is opened, until the wiper 4 reaches a predetermined end position to which it will always be moved in this way whenever the operator opens the switch 6 to stop the operation of the wiper.

Of course, the above-described structure serves to effect wiping of the windshield during periods of rain, snow, or the like. In order to bring about cleaning of the windshield, a feeding means 9–14 is provided for feeding cleaning liquid from a tank 8 to the area 5. This feeding means includes a suction conduit which communicates with the cleaning liquid in the tank 8 and with a suction valve 10. An electromagnetically actuated pump 11 sucks the cleaning liquid through the conduit 9 and suction valve 10 and discharges the cleaning liquid under pressure through the outlet valve 12 and along the discharge conduit 13 to the nozzle 14 from which the liquid is directed in a stream to the area 5.

In the particular example illustrated in FIG. 1 the electromagnetically actuated pump 11 is located in a circuit 15 which is controlled by an operating means 16 which is operatively connected to the feeding means for operating the latter in a manner described below. This operating means 16 is set into operation at the will of the operator and after effecting an initial increment of operation, in response to actuation by the operator, sustains itself in operation until the wiper 4 has been moved through a given number of operating cycles, so that the cleaning liquid is fed only during this number of operating cycles, whereupon the operating means 16 automatically terminates the operation.

The operating means 16 includes a ratchet wheel 17 which in the example of FIG. 1 is capable of being actuated both by a motor-driven pawl 21 and an electromagentically actuated pawl 19. The electromagnet 18 is operatively connected to the pawl 19 in a manner described below for actuating the pawl 19. The motor 1 rotates a cam 20 which operates the pawl 21 also in a manner described below.

The pawl 19 is connected to an armature 23 of the electromagnet, this armature being pivotally supported at 22 for turning movement, and a spring 24 acts on the armature 23 to urge the pawl 19 connected thereto against a stationary stop 25 in the housing of the operating means 16.

The pawl 21 is connected with a lever 27 which is pivotally mounted at 26 and which is connected to spring 28 which urges the lever 27 in a clockwise direction, as viewed in FIG. 1, so that it will remain in engagement with the cam 20. Both of the pawls 19 and 21 are made of suitably shaped springy sheet metal, and they operate in such a way that their free ends press against the toothed periphery of the ratchet wheel 17. Thus, each pawl will operate to advance the ratchet wheel 17 in one direction and to prevent turning of the ratchet wheel in an opposite direction. Thus, during the return stroke of one pawl the other pawl will prevent the ratchet wheel from turning in the reverse direction.

The ratchet wheel is provided with a gap 29 where at least one tooth is missing, and in the rest position of the operating means 16 the free end of the pawl 21 is situated in the gap 29 so that at this time the pawl 21 can move back and forth during rotation of the cam 20 without advancing the ratchet wheel 17. Thus, when the operator closes the switch 6 for operating only the wiper (without any operation of the cleaning structure) the pawl 21 will simply move back and forth in the gap 29 without turning the ratchet wheel 17. The pawl 19 has a pair of springy free end portions which cooperate with the teeth 17 in such a way that the continued, stepwise turning of the ratchet wheel is guaranteed even when the gap 29 is in the region of the pawl 19. In other words, when the gap 29 is in the region of the free ends of pawl 19, the pawl 21 will act to advance the ratchet wheel 17 in a counterclockwise direction, as viewed in FIG. 1, but the pawl 19 must act at this time to prevent turning of the ratchet wheel 17 in a clockwise direction during the return movement of the pawl 21, and the spacing between the free ends of the pawl 19 is great enough to guarantee that one of these ends will engage the face of a tooth of the ratchet wheel 17 in the region of the gap 29 thereof to prevent clockwise turning of the ratchet wheel 17. If the free ends of the pawl 19 were located too close to each other they might both be situated in the gap 29 permitting the wheel 17 to oscillate back and forth with the pawl 21 without any continued stepwise turning of the ratchet wheel 17, and this undesirable result is prevented by the proper spacing of the tips of the pawl 19.

A manually operable means is available to the operator for effecting the initial increment of operation of the operating means 16, and this manually operable means is in the form of a switch 30 connected in the circuit of the electromagnet 18 in the manner shown in FIG. 1. Thus, the operator need only close the switch 30 for an instant in order to energize the elctromagnet 18 so as to displace the armature 23 and the pawl 19 and advance the wheel 17 through the initial increment required to displace the gap 29 beyond the pawl 21. The cam 20 is rotated in synchronism with the crank rod 2 and has an angular position with respect to this rod which actuates the pawl 21 when the wiper 4 is passed through its rest position determined in the manner described above by the switch 7.

The ratchet wheel 17 is coaxially fixed to a metallic switch disc 31 which is provided at its periphery with uniformly distributed substantially sector-shaped notches which receive the correspondingly shaped insulating members 32 which are not electrically conductive, while of course the remainder of the disc is electrically conductive. A pair of slip-contacts 33 and 34 resiliently engage the side of the disc 31 so that the latter slides with respect to the contacts 33 and 34 during turning of the ratchet wheel 17, and these contacts 33 and 34 together with the switch-disc 31 form an interrupter switch assembly for closing and opening the circuit 15 of the pump 11. The contacts 33 and 34 are situated in such a position that both of these contacts simultaneously engage either a pair of insulating members 32 or electrically conductive portions of the disc 31. In the illustrated rest position of the operating means 16 the contacts 33 and 34 engage a pair of insulating pieces 32 so that the circuit 15 is open and of course the pump 11 is not operating. During each step in the turning of the ratchet wheel 17 a pair of insulating pieces 32 move beyond the contacts 33 and 34 while a succeeding pair of electrically conductive portions of the disc 31 slide past the contacts 33 and 34 and then the next pair of insulating pieces 32 will engage the contacts 33 and 34, so that at each step of the turning of the ratchet wheel 17 the pump 11 is actuated for a short period of time to provide a momentary jet of cleaning liquid directed from the nozzle 14 to the area 5. Thus, at each step of the turning of the ratchet wheel 17 an individual jet of cleaning liquid is applied to the area 5.

Of course, as was pointed out above, as soon as the switch 6 is closed the motor 1 operates. At the same time the circuit 15 is in readiness to be closed as soon as the circuit between the contacts 33 and 34 is closed by the disc 31. The pawl 21 oscillates back and forth in the gap 29 without advancing the ratchet wheel 17 toward its rest position. Thus, the wiper 4 is driven back and forth over the area 5 while the pump 11 remains unenergized.

With the structure operating in this way the operator need only close the switch 30 for an instant in order to set the operating means 16 into operation. The actuation of the manually operable means 30 will close the circuit of the electromagnet 18 so as to move the pawl 19 through a stroke which advances the ratchet wheel 17 sufficiently to enable the pawl 21 to continue the stepwise turning thereof, and thus the manually operable means 30 brings about the actuation of the operating means 16 through the initial increment of operation which, when once completed, places the operating means 16 in a condition where it will sustain itself in operation. Thus, the first step in the turning of the ratchet wheel 17 is brought about by the pawl 19. The initiation of the operation of the operating means 16 takes place independently of the wiper 4 at any time during the operation of the latter simply by manual closing of the switch 30, and as soon as the switch 30 is closed the operator can release the switch 30 so that it will automatically open.

This initial advance of the wheel 17 by the pawl 19 turns the disc 31 through an angle sufficient to start and stop the pump 11 in the manner described above, so that the first jet of cleaning liquid is directed against the area 5 in response to closing of the switch 30.

Since the gap 29 is displaced beyond the pawl 21, the oscillation of the latter by the cam 20 during operation of the motor 1 continues the stepwise turning of the ratchet wheel 17, and each time the ratchet wheel 17 is advanced through one step the pump 11 is started and stopped, and the starting of the pump 11 takes place as the wiper 4 passes through its rest position. After a given number of steps the ratchet wheel 17 will again have its gap 29 aligned with the pawl 21 so that the operating means 16 automatically terminates its own operation as well as the actuation of the feeding means 9–14, and the operator can at any time stop the driving of the wiper 4 by opening the switch 6.

FIG. 2 illustrates some of the details of elements of the operating means 16. The operating means is mounted in a housing 40 which is directly fixed to the housing of the motor 1 and the housing 40 can be closed by a cover 41. The ratchet wheel 17 and the disc 31 form a single unit 42 which is freely turnable on and easily removable from a pin 43 carried by the housing 40. The core of the electromagnet 18 is fixed to a U-shaped member 44 which is fixed in the housing 40, and the armature 23 is pivotally connected to one leg of the member 44. The cover 41 carries a pin 46 which is coaxial with the pin 43 and which extends into the axial bore of the unit 42.

The lever 27, which carries the pawl 21, is formed from a stamped and suitably shaped piece of sheet metal which is pivotally supported by a pin 47 mounted in the housing 40. A plunger 48 engages the end of the lever 27 which is distant from the pawl 21, and this plunger 28 extends through an opening in a side wall of the housing 40 into the interior of a housing 49 which is fixed to the motor housing and which is located beside the housing 40 in engagement with the latter. The housing 49 houses suitable gearing driven by the motor and driving a cam corresponding to the cam 20 and acting on the plunger 48 to oscillate the lever 29 in the manner described above.

The entire unit 42 is in the form of a plastic casting shaped in a suitable mold, and within the plastic material is embedded a metallic contact disc 50 formed at its outer periphery with uniformly distributed, substantially sector-shaped notches 51. The plastic material 52 fills these notches, as shown in FIG. 3, and is flush with the face 53 of the disc 50 which is visible in FIG. 3. Thus, the face 53 of the disc 50 is exposed while the non-conductive plastic material 52 fills the notches 51 to form the non-conductive elements 52 which are flush with the face 53. Thus, this face 53 has a pair of concentric, annular contact zones 54 and 55, the outer zone 54 being alternately metallic and non-metallic while the inner annular zone 55 is all metallic. The springy slip-contacts 33 and 34 respectively have their free ends pressing against these annular zones 54 and 55 so that the free end of the contact 33 will alternately engage the conductive and non-conductive portions in the zone 54 while the contact 34 will engage only the zone 55 which is electrically conductive at all parts thereof. The contact 34 is illustrated only in part in FIG. 2 for the sake of clarity, and for the same reason the electrical leads to the electromagnet 18 are also not illustrated. Of course, at the end of each step of turning of the ratchet wheel 17 one of the non-conductive portions 52 will engage the contact 33 so that the circuit to the pump is open, and during each turning step the disc is turned through an angle sufficient to displace the next non-conductive portion 52 into engagement with the contact 33.

The embodiment of FIG. 4 differs from that of FIGS. 1–3 principally by having a different drive between the motor means 1 and the operating means 16. While in FIGS. 1–3 this drive is mechanical, the drive in FIG. 4 is electrical.

Thus, with the embodiment of FIGS. 1–3 the drive to the operating means 16 is by way of the pawl 21, while in FIG. 4 the operating means 16' is driven by providing electrical impulses for the electromagnet 18 so as to advance the ratchet wheel 17' by the single pawl 19' of this embodiment. The electromagnet 18 is connected into a first circuit 56 and into a second circuit 57, 58, 59, the switch 30, which forms the manually operable means as described above, forming part of the circuit 56. The circuit 57–59 includes the switch 60 which is periodically closed during operation of the motor 1, and also this circuit includes a switch 61 which is open in the rest position of the operating means 16'. The switch 60 includes a metallic switch disc 62 which is in permanent engagement with a slip-contact 63 connected by the conductor 57 to one pole of the source of current B. Except for an electrically conductive portion 64, the entire periphery of the disc 62 is provided with a layer of non-conductive material, and this periphery is permanently engaged by the springy slip-contact 65 which is connected by the conductor 58 to a clip-contact 66 which permanently is in sliding engagement with the metallic disc 67 of the switch 61, this metallic disc having a single notch filled with the non-conductive material 68. The periphery of the disc 67 is in permanent sliding engagement with a springy slip-contact 69 which is connected by the conductor 59 to the electromagnet 18 and by the conductor 70 to the pump 11. The disc 67 is coaxially fixed to the ratchet wheel 17' for turning movement therewith and may form a single unit therewith as described above in connection with the ratchet wheel 17' and the disc 31.

Each time the wiper moves from its rest position the switch 60 provides a momentary electrical connection between the conductors 57 and 58 by engagement of the portion 64 of the disc 62 with the contact 65. However, in the rest position of the operating means 16' of FIG. 4 the switch 61 prevents the circuit to the electromagnet 18 through the conductor 59 from being completed since in the rest position of the operating means the contact 69 engages the non-conductive portion 68 of the switch 61.

However, when the operator momentarily closes the switch 30 the electromagnet 18 is energized through the conductor 56 to advance the pawl 19' through the initial step of the ratchet wheel 17' thus turning the disc 67 through an angle sufficient to displace the non-conductive portion beyond the contact 69. The switch 6 will of course have been closed in order to set the motor 1 into operation so that when the switch 60 closes an additional impulse will be provided to the electromagnet 18 through the conductor 59 and at the same time an impulse will be delivered through the conductor 70 to the pump, so that after the initial increment of operation of the operating means 16' has been manually effected by closing of the switch 30, the operating means 16' will maintain itself in operation providing at each revolution of the disc 62 an energizing impulse for the electromagnet 18 and the pump 11 so that the ratchet wheel 17' is turned in a stepwise manner and impulses are delivered to the pump 11 while the motor 1 drives the wiper. Here again it will be noted that the initial impulse to the electromagnet 18 by closing of the switch 30 has no relation to the operation of the wiper and can take place at any time during an operating cycle of the wiper. Moreover, the closing of the switch 30 provides a closed circuit through the conductors 56, 59 and 70 to the pump 11 for sending an initial impulse thereto to provide a jet of cleaning liquid in the manner described above. The operating means 16' will automatically maintain itself in operation until the nonconductive portion 68 again reaches the contact 69.

The structure of FIG. 4 is particularly simple inasmuch as only a single pawl 19' with but one tooth is required. A second pawl 19" is provided to prevent reverse turning of the ratchet wheel 17'. Moreover, the operating means 16' of FIG. 4 can be mounted at any suitable location independently of the motor means 1 inasmuch as it is connected with the motor means only through the conductor 58. The switch 7 can be controlled by a cam which forms a unit with the switch 69, so that an exceedingly compact assembly can be provided. FIG. 4a shows a slight modification of the arrangement described above in connection with FIG. 4. In the arrangement shown in FIG. 4a, the operating means 16''' form a unitary assembly with the pump 11', and in this unitary assembly the single electromagnet 18' serves as the driving magnet for the pump as well as for the pawl 19'. FIG. 4a shows only the operating means 16''' and the conductors 56 and 58 and it is to be understood that the remaining part of the arrangement is the same as in FIG. 4. Of course the conductor 70 is omitted, since the pump 11 shown at the right side of FIG. 4 is replaced by the pump 11' directly driven by the electromagnet 18'.

Instead of pump 11 which operates only with impulses, it is possible to use a continuously operating pump with the embodiment of FIG. 4, and in this embodiment such a pump is of particular advantage since it will provide a continuous stream of cleaning liquid as long as the operator maintains the switch 30 closed, so that in this way a relatively large amount of cleaning liquid can be applied. Moreover, with such an arrangement the switch 30 can be closed at any time during the running of the operating means 16 to provide more cleaning liquid, without in any way affecting the operation undesirably. All that will happen is that the ratchet wheel 17' will remain stationary during the time that the operator maintains the switch 30 closed, but the stepwise turning of the ratchet wheel 17' will automatically resume upon release of the switch 30.

The embodiment of FIG. 5 also has an operating means 16'' which advances a disc switch in a stepwise manner, but with the embodiment of FIG. 5 the operating means automatically maintains the motor means 1 energized until the operating means has effected the predetermined number of operating cycles of the wiper. Moreover, the embodiment of FIG. 5 automatically terminates the operation of the pump before all of the cycles of operation of the wiper have been completed.

Thus, referring to FIG. 5, it will be seen that this embodiment is quite similar to that of FIG. 4. The embodiment of FIG. 5 adds to the structure of FIG. 4 the switches 75 and 76 which are also connected to the ratchet wheel 17' to turn together with the latter and the switch 61 described above in connection with FIG. 4. The switch 75 has the same construction as the switch 61 but is connected in a circuit 77 in which the motor means 1 is located so that as long as the switch 75 is closed the motor means 1 will be energized through the circuit 77. The switch 76 is in the circuit 78 of the pump 11, so that the circuit 78 and switch 76 of FIG. 5 replace the conductor 70 of FIG. 4. Thus, in FIG. 5 the switch 61 is connected only through the conductor 59 to the electromagnet 18 and the conductor 58 is connected directly to the circuit 78. The switch 75 opens and closes in synchronism with the switch 61 and while the switch 76 closes at the same time as the switches 75 and 61, this switch 76 will open somewhat before the switches 75 and 61. Thus, it will be seen that the switch 76 includes a longer notch provided with a longer section of non-conductive material.

The actuation of the manually operable means 30 of FIG. 5 will close all of the switches 61, 75 and 76 due to the initial step of turning of the ratchet wheel 17' by the energizing of the electromagnet 18. Thus, with this embodiment also the first operating impulse of the pump 11 is obtained through the conductors 56 and 59, the switch 61, and the circuit 78 in which the switch 76 is closed by the first step of turning of the ratchet wheel 17'. Because the circuit 77 is closed at this time the motor 1 will continue to operate even if the switch 6 is open, and thus the motor 1 will turn the switch 60 to provide the impulses which advance the ratchet wheel 17' and the switches 61, 75 and 76, providing a jet of cleaning liquid at each operating cycle of the wiper in the manner described above. Before the switches 61 and 75 open, however, the switch 76 will open to stop the operation of the pump 11 while the motor 1 continues to operate to provide a relatively small number of additional operating cycles for the wiper until the switches 75 and 61 again open so as to automatically terminate the operation.

It will be understood that each of the elements described above, or two or more together, may also find a useful application in other types of wiper assemblies differing from the types described above.

While the invention has been illustrated and described as embodied in wiper assemblies for windshields or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a wiper assembly for windshields or the like, in combination, motor means for driving a wiper over a given area of a windshield or the like; feeding means for feeding liquid to said area so that the operation of the wiper over the area together with the liquid applied thereto can be used for cleaning said area; operating means operatively connected to said feeding means for operating the latter to feed liquid to said area during a given number of cycles of operation of the wiper by said motor means, said operating means terminating the operation of said feeding means automatically after said number of cycles of operation of said wiper and said operating means maintaining itself automatically in operation after having effected an initial increment of operation, said operating means including a ratchet wheel and a pawl coacting with said ratchet wheel for stepping the latter through a given number of steps before terminating the operation of said feeding means and said initial increment of operation being effected by an initial turning of said ratchet wheel by said pawl; electromagnetic means operatively connected to said pawl for actuating the latter to step said ratchet wheel through successive increments at each actuation of said electromagnetic means; manually operable means operatively connected to said electromagnetic means for manually energizing the latter to effect said initial increment of operation so as to start said operating means whereafter the latter will maintain itself in operation until terminating the operation of said feeding means; and actuating means controlled by said motor means for continuing the stepping of said ratchet wheel after the initial operation thereof until said operating means terminates the operation of said feeding means.

2. In an assembly as recited in claim 1, said actuating means being electrical and actuating said electromagnetic means and pawl for stepping said ratchet wheel during operation of said motor means.

3. In a wiper assembly for windshields or the like, in combination, motor means for driving a wiper over a given area of a windshield or the like; feeding means for feeding liquid to said area; operating means operatively connected to said feeding means for operating the latter during a given number of cycles of operation of a wiper by said motor means, said operating means then terminating the operation of said feeding means automatically, and said operating means including a single ratchet wheel having at one location a gap where no teeth are located, said operating means including an electromagnetically actuated pawl and a motor-driven pawl both of which cooperate with said ratchet wheel, said motor-driven pawl being located in said gap in the rest position of said operating means; and manually operable means operatively connected to said electromagnetically actuated pawl for actuating the latter to initially turn said ratchet wheel through an increment sufficient to continue the turning thereof by said motor-driven pawl until said gap again reaches said motor-driven pawl to terminate the operation of said feeding means, said electromagnetically actuated pawl acting to limit the turning of said ratchet wheel to one direction of rotation, and said electromagnetically actuated pawl having a pair of teeth engaging said ratchet wheel and spaced from each other by a distance sufficiently great to cooperate with the teeth of the ratchet wheel to limit the turning thereof to said one direction even when said gap is in the region of said electromagnetically actuated pawl.

4. In a wiper assembly for windshields or the like, in combination, motor means for driving a wiper over a given area of a windshield or the like; feeding means for feeding liquid to said area, said feeding means being electrically operable; operating means operatively connected to said feeding means for operating the latter to feed liquid during a given number of cycles of operation of the wiper and for then terminating the operation of said feeding means, said operating means automatically maintaining itself in operation after effecting an initial increment of operation, and said operating means including a rotary member, a pair of slip-contacts engaging said rotary member and connected electrically with said feeding means and drive means controlled by said motor means for turning said rotary member after said initial operation of said operating means, said rotary member including electrically non-conductive and electrically conductive portions cooperating with said slip-contacts for energizing said feeding means at at least one angular position of said rotary member; and manually operable means operatively connected to said operating means for manually actuating the latter to effect said initial increment of operation.

5. In an assembly as recited in claim 4, said rotary member including a plurality of electrically conductive portions alternating with a plurality of electrically non-conductive portions and cooperating with one of said slip-contacts in succession during rotation of said rotary member and said rotary member having an electrically conductive portion which remains at all times in contact with the other slip-contact so that during turning of said rotary member said one slip-contact will be alternately engaged by electrically conductive and electrically non-conductive portions for energizing and deenergizing said feeding means, and said drive means including a ratchet wheel and a pawl which steps the latter around, said ratchet wheel being operatively connected to said rotary member for stepping the latter through increments which displace an electrically non-conductive portion beyond said one slip-contact while moving in electrically conductive portion past the latter until the next electrically non-conductive portion reaches said one slip-contact, so that during each step in the turning of said ratchet wheel said feeding means will be energized once and will then be deenergized.

6. In an assembly as recited in claim 5, said ratchet wheel and rotary member being directly connected to each other and forming a single unit.

7. In a wiper assembly for windshields or the like, in combination, motor means for driving a wiper over a given area of a windshield, said motor means being electrical; switch means operatively connected to said motor means to be actuated thereby for terminating the operation of said motor means automatically when the wiper driven thereby is in a given position so that when the operation of said motor means is manually terminated said motor means will continue to operate until the wiper reaches a given location; feeding means for feeding liquid to said area; electrical operating means operatively connected to said feeding means for maintaining the latter in operation during a given number of cycles of operation of the wiper by said motor means, said electrical operating means after being initially set into operation maintaining itself in operation while said motor means continues to operate until a given number of cycles of the wiper has been completed, said operating means including an electromagnetically actuated pawl and ratchet assembly which is stepped through a given number of steps to operate said feeding means during said given number of cycles of operation of the wiper, and a switch means driven by said motor means for actuating said operating means to operate said feeding means during operation of said motor means, said latter switch means and the switch which maintains said motor means in operation until said wiper reaches a given position forming a single unit; and manually operable means operatively connected to said operating means for initially effecting the operation thereof to place said operating means in a condition where it will maintain itself in operation.

8. In a wiper assembly, in combination, motor means for driving a wiper over a given area of a windshield or the like, feeding means for feeding liquid to said area; electrical operating means for operating said feeding means, said electrical operating means including a ratchet assembly which steps through a given number of steps during operation of said operating means, said operating means maintaining itself in operation after effecting an initial step and including a switch means actuated by said motor means and operating both said ratchet assembly and said feeding means during operation of said motor means until a given number of cycles of operation of said wiper has been completed; and manually operable means operatively connected to said operating means for initiating the operation thereof.

9. In a wiper assembly for windshields or the like, in combination, motor means for driving a wiper over a given area of a windshield or the like; feeding means for feeding liquid to said area, said feeding means being electromagnetically operated; electromagnetic operating means operatively connected to said feeding means for actuating the latter to feed liquid to said area during a given number of operating cycles of the wiper by said motor means, said operating means maintaining itself in operation during operation of said motor means until said given number of cycles has been completed and said operating means and feeding means being actuated from a single electromagnet which is common to said operating means and feeding means; and manually operable means operatively connected to said operating means for initially setting the latter into operation.

10. In a wiper assembly for windshields or the like, in combination, motor means for driving a wiper over a given area of a windshield or the like; feeding means for feeding liquid to said area; operating means operatively connected to said feeding means for operating the latter to feed liquid to said area during a given number of cycles of operation of the wiper; and electrical means operatively connected to said motor means, operating means, and feeding means for maintaining the latter in operation, said electrical means terminating the operation of said feeding means while maintaining said motor means in operation to effect a given number of cycles of operation of said wiper after termination of the operation of said feeding means; and manually operable means operatively connected to said electrical means for initiating the operation thereof only, said electrical means maintaining itself in operation automatically and automatically terminating its own operation when said motor means has driven the wiper through a given number of cycles after termination of the operation of said feeding means.

References Cited by the Examiner
UNITED STATES PATENTS

| | | | |
|---|---|---|---|
| 2,936,476 | 5/60 | Ziegler | 15—250.02 |
| 3,095,596 | 7/63 | Oishei et al. | 15—250.02 |

FOREIGN PATENTS 915,421    7/54    Germany.

CHARLES A. WILLMUTH, *Primary Examiner*.